(12) United States Patent
Finnäs et al.

(10) Patent No.: US 11,745,822 B2
(45) Date of Patent: Sep. 5, 2023

(54) BICYCLE HANDLEBAR GRIP ASSEMBLY AND BICYCLE HANDLEBAR

(71) Applicant: Herrmans Bike Components Ltd, Jakobstad (FI)

(72) Inventors: Thomas Finnäs, Jakobstad (FI); Joel Savikko, Kokkola (FI)

(73) Assignee: Herrmans Bike Components Ltd, Jakobstad (FI)

( * ) Notice: Subject to any disclaimer, the term of this patent is extended or adjusted under 35 U.S.C. 154(b) by 0 days.

(21) Appl. No.: 17/668,646

(22) Filed: Feb. 10, 2022

(65) Prior Publication Data

US 2022/0258829 A1 Aug. 18, 2022

(30) Foreign Application Priority Data

Feb. 12, 2021 (FI) .................................. 20215148

(51) Int. Cl.
*B62K 21/26* (2006.01)

(52) U.S. Cl.
CPC .................................. *B62K 21/26* (2013.01)

(58) Field of Classification Search
CPC ...................................................... B62K 21/26
See application file for complete search history.

(56) References Cited

U.S. PATENT DOCUMENTS

| 6,035,742 | A |   | 3/2000 | Hollingsworth et al. |
| 6,067,875 | A | * | 5/2000 | Ritchey ................. B62M 25/04 74/502.2 |
| 6,209,413 | B1 | * | 4/2001 | Chang .................... B62M 25/04 74/489 |
| 6,615,688 | B2 | * | 9/2003 | Wessel ................... B62K 23/04 74/551.9 |
| 8,220,357 | B2 | * | 7/2012 | Chen ...................... F16C 1/145 74/489 |
| 2012/0073086 | A1 |   | 3/2012 | Rarick |
| 2017/0253292 | A1 | * | 9/2017 | Cederstrom .......... B62K 21/12 |

FOREIGN PATENT DOCUMENTS

| DE | 99050 C | 4/1897 |
| EP | 1157921 A2 | 11/2001 |
| GB | 189320374 A | 4/1894 |

OTHER PUBLICATIONS

Finnish Search Report dated Apr. 12, 2021 in FI Patent Application No. 20215148, 1 page.
EPO Search Report dated Jul. 11, 2022 in corresponding EP application No. 22155759.8, 2 pages.

* cited by examiner

*Primary Examiner* — Vicky A Johnson
(74) *Attorney, Agent, or Firm* — Meunier Carlin & Curfman LLC

(57) ABSTRACT

The bicycle handlebar grip assembly is disclosed. The assembly comprises an inner core having a first contact surface and an outer sleeve having an inner surface and a third contact surface on the inner surface. The outer sleeve is configured to enclose at least a major part of the inner core, when the grip assembly is installed to a handle-bar. The inner core and the outer sleeve are separate parts, which are configured to be bonded together by friction force acting between the first contact surface of the inner core and the third contact surface of the outer sleeve, when the grip assembly is installed to a handlebar.

19 Claims, 3 Drawing Sheets

Fig. 1c  A-A    B-B

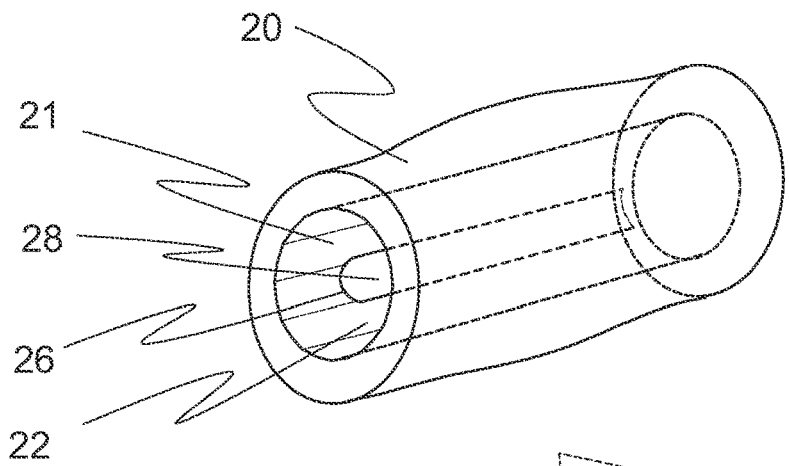
Fig. 2a
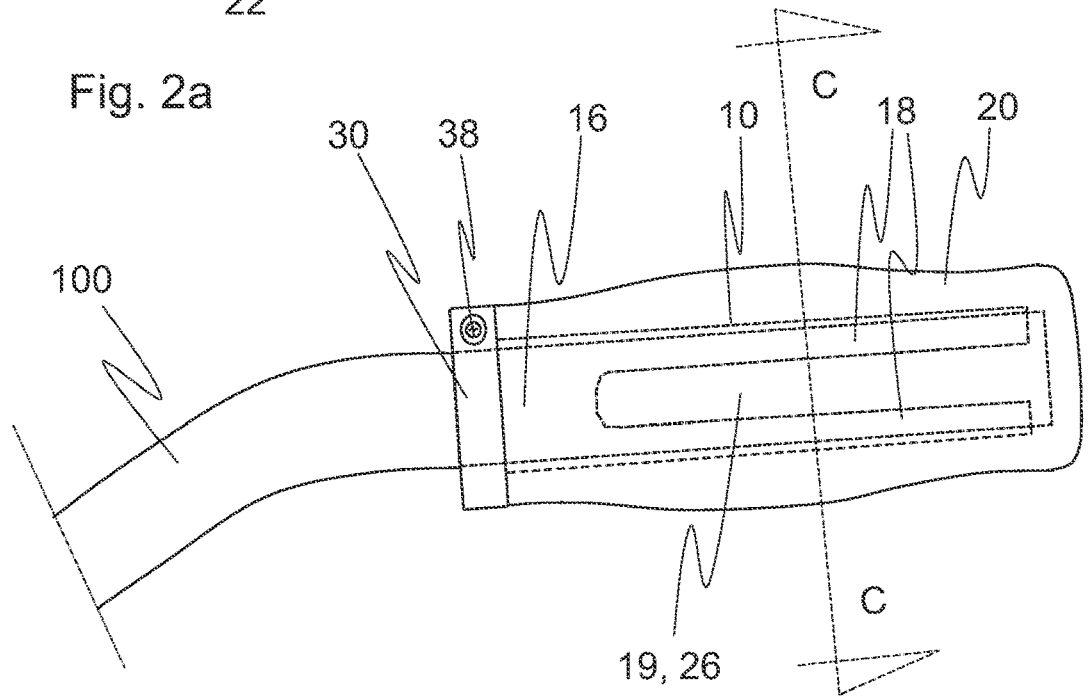
Fig. 2b
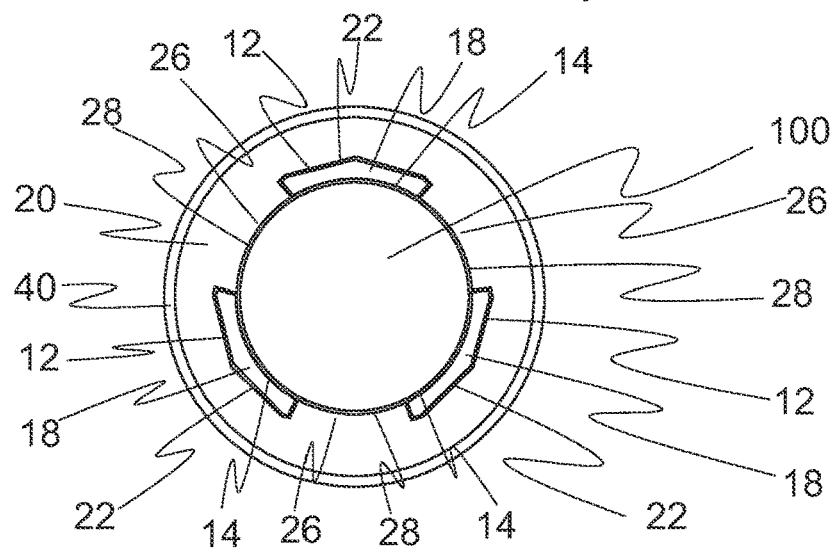
Fig. 2c   C-C

BICYCLE HANDLEBAR GRIP ASSEMBLY AND BICYCLE HANDLEBAR

CROSS-REFERENCE TO RELATED APPLICATIONS

This application claims priority under 35 USC § 119 to Finnish Patent Application No. 20215148 filed on Feb. 12, 2021.

TECHNICAL FIELD

The invention relates to a bicycle handlebar grip assembly, comprising an inner core having a first contact surface and an outer sleeve having an inner surface and a third contact surface on the inner surface, which inner core and outer sleeve are separate parts, which are configured to be bonded together by friction force acting between the first contact surface of the inner core and the third contact surface of the outer sleeve and which outer sleeve is configured to enclose at least a major part of the inner core, when the grip assembly is installed to a handlebar. The invention further relates to a bicycle handlebar comprising at least one grip assembly.

BACKGROUND ART

Bicycle handlebars are usually made of shaped metal tubes. On both ends of the handlebar there are grips for providing firm and comfortable gripping position for cyclist's hand. Handlebar grip can be a one-piece item made of single soft material, such as TPE (Thermoplastic elastomer), TPU (Thermoplastic urethane) or silicone. Alternatively, the grips can be composed of two parts: a hard inner core and soft outer sleeve. The inner core and outer sleeve are made of different materials and bonded together by mechanical interlocking, by fusing or by adhesive.

A problem relating to a one-part handlebar grip is, that the grip is difficult to assemble in place. The grip must fit tightly around the handlebar end to create enough friction force, which holds the grip in place. If the hole in the grip is too loose, the grip may rotate around the handlebar. However, tight dimensioning of the grip hole creates friction forces also when the grip is pressed around the handlebar end, i.e., the friction forces resist the installation of the grip. To overcome the friction force during installation it is often necessary to use pressurized air and/or lubricants, such as isopropyl alcohol or soap, which complicates the installation process.

In two-part grips the inner core is usually made from a hard material that does not flex. Hence, the inner core will not conform to the handlebar shape whereby dimensions of the handlebar must be accurate and deviations need to be small for achieving tight fit. Between the hard and smooth inner core and the smooth outer surface of the handlebar there is not enough friction, which would hold the grip in place during use of the bicycle. Therefore, the inner core must be secured in place with a lock ring and a locking screw. The lock ring prevents unfastening of the grip from the handlebar end. However, the lock ring does not always provide enough friction against rotation of the grip.

As always when dealing with plastics, recyclability is a key problem that needs to be addressed, both for economic and environmental reasons. Two-part grips consist of two different material which are bonded together. This means that when recycling, the product first needs to be mechanically ground up, after which the different materials could be separated before re-granulating them individually, which is a complicated and costly process.

Bicycle grips must be able to withstand UV light, high and low temperature, rain and snow, dirt from the road and sweat and abrasion from the biker's hands. Once the grip has been worn out, the user would buy a new pair of grips. In two-part grips however, the hard inner core is usually made from a fiber reinforced, UV stabilized material, which would under most circumstances have a much longer lifespan than the softer outer sleeve. Instead of throwing the whole grip away once the outer sleeve has been worn out, it would make much more sense to replace only the worn outer sleeve. However, in known two-part grips this is not possible.

When making a two-part multilayer grip using injection moulding, the layers must be bonded together. A most practical way to bond the layers is to fuse the layers together when being melted. However, this is not possible for some material combinations for various reasons. As an example, a lockable foam grip could not be produced by injection moulding alone.

Document U.S. Pat. No. 6,035,742 discloses a multi-part handlebar grip, which has an inner piece which is secured in a non-turning manner to the handlebars. An outer hand contacting portion interlocks with the inner portion of the grip. The outer portion slides over the inner portion and is then locked in place over the inner portion.

Document GB 189320374 discloses a cycle-handle comprising a combination of bellied, beaded staves, bars or strips of wood, cork, rubber, vulcanite or other equivalent material with alternate metal space-bars, the whole being secured together by means of a ring and a cap.

Document US 20120073086 A1 discloses an ergonomic hand grip assembly for attenuating shocks and impacts and reducing discomfort occasioned by use. The assembly includes a slotted sleeve member disposed between an elastomeric outer cover and an inner control member.

An object of the invention is to provide a bicycle handlebar grip assembly and a bicycle handlebar, with which drawbacks relating to the prior art can be diminished.

The object of the invention is achieved with the bicycle handlebar grip assembly and bicycle handlebar, which are characterized in what is disclosed in the independent patent claim. Some preferred embodiments of the invention are disclosed in the dependent claims.

SUMMARY OF THE INVENTION

The bicycle handlebar grip assembly according to the invention comprises an inner core having a first contact surface and an outer sleeve having an inner surface and a third contact surface on the inner surface, which outer sleeve is configured to enclose at least a major part of the inner core, when the grip assembly is installed to a handlebar. The inner core and the outer sleeve are separate parts, which are configured to be bonded together by friction force acting between the first contact surface of the inner core and the third contact surface of the outer sleeve, when the grip assembly is installed to a handlebar. The inner core has a substantially annular base part, at least two, preferably three, substantially parallel wings extending from the base part and slots between the adjacent wings. Expression "substantially annular" means that the base may have a form of a full circle or a part of a circle.

In a first preferred embodiment of the grip assembly according to the invention the first contact surface of the inner core comprises a number of adjacent flat or concave surfaces and between each adjacent surface there is an angle.

In a second preferred embodiment of the grip assembly according to the invention the wings have a chute-like second contact surface configured to be pressed against the outer surface of the handlebar, when the grip assembly is installed to the handlebar.

In yet another preferred embodiment of the grip assembly according to the invention the wings are flexible, spring-like elements. Preferably, in non-strained condition the wings are in a curved form in the longitudinal direction on the wing. The wings are in non-strained condition, when the grip assembly is not mounted to the end of the handlebar.

A yet another preferred embodiment of the grip assembly according to the invention it further comprises clamping means for securing the inner core to the handlebar. The clamping means may comprise separate parts configured to clamp the base part of the inner core to the outer surface of the handlebar. Alternatively, the clamping means may be integrated to the base part of the inner core. Preferably, said clamping means comprise an annular lock ring.

In yet another preferred embodiment of the grip assembly according to the invention the inner surface of outer sleeve has grooves configured the receive the wings of the inner core when the grip assembly is installed to the handlebar. Preferably said grooves and said wings have matching dimensions, i.e. the wings fill the volume of the grooves substantially fully.

In yet another preferred embodiment of the grip assembly according to the invention between the grooves in the inner surface there are ribs, which ribs are configured to enter to the slots in the inner core, when the grip assembly is installed to the handlebar. Preferably, said ribs and said slots have matching dimensions, i.e. the ribs fill the whole volume of the slots substantially fully.

In yet another preferred embodiment of the grip assembly according to the invention the ribs have a fourth contact surface configured to be pressed against the outer surface of the handlebar, when the grip assembly is installed to the handlebar.

In yet another preferred embodiment of the grip assembly according to the invention said inner core and said outer sleeve are made of different materials. Preferably, the material of said outer sleeve is softer than the material of said inner core.

In yet another preferred embodiment of the grip assembly according to the invention the inner core comprises fiber reinforced plastic and the outer sleeve comprises TPE (thermoplastic elastomer), TPU (thermoplastic urethane), TPU-foam, silicone gel or silicone foam. Preferably the outer sleeve is made by injection moulding, extruding, 3D-printing or by vacuum moulding.

In yet another preferred embodiment of the grip assembly according to the invention on the outer surface of the outer sleeve there is a top layer, which top layer and outer sleeve are made of different materials. The top layer may be a wear-resistant skin on a foamy outer sleeve. Preferably, the top layer is at least partly made of fabric, genuine leather or artificial leather.

The bicycle handlebar comprises at least one grip assembly, which contains the features of any of the grip assembly embodiments explained above.

An advantage of the grip assembly according to the invention is, that it is easy to install to the handlebar.

Another advantage of the invention is, that fastening of grip utilizes both the lock ring and the friction between outer sleeve and the handlebar, which makes fastening firm and reliable.

A further advantage of the invention is that recycling of the used grips is easy, because the inner core and the outer sleeve are separate parts.

A further advantage of the invention is that the outer sleeve can be replaced when worn out, while the inner core can be made to last much longer and be reused. This makes also possible to change the outer sleeve design depending on usage of the bike.

A further advantage of the invention is that there are no restrictions for material combinations that can be used, since there is no need to bond the materials together. Different fabrication methods can be used for different parts without problem.

A further advantage of the invention is that manufacturing of the grips is less complicated and cheaper. Since the inner core would be the same for all grips within this modular range, the tooling cost would be spread over a much higher volume of products. As for the time needed to develop a new design for a grip, only the outer sleeve would need to be re-designed. This speeds up the process of developing a new product significantly.

BRIEF DESCRIPTION OF THE DRAWINGS

In the following the invention will be described in detail, by way of examples, with reference to the accompanying drawings in which, FIG. 1c depicts cross-sections of the inner cores taken at plane A-A and B-B show in FIGS. 1a and 1 b, FIG. 2a depicts an outer sleeve of the grip assembly according to the invention seen obliquely from above, FIG. 2b depicts a bicycle handlebar comprising a grip assembly according to the invention. Broken line C-C indicates plane upon which a section view is taken in FIG. 2c, and FIG. 2c depicts a cross-section of the bicycle handlebar taken at plane C-C shown in FIG. 2b.

DETAILED DESCRIPTION

Figure 1A:
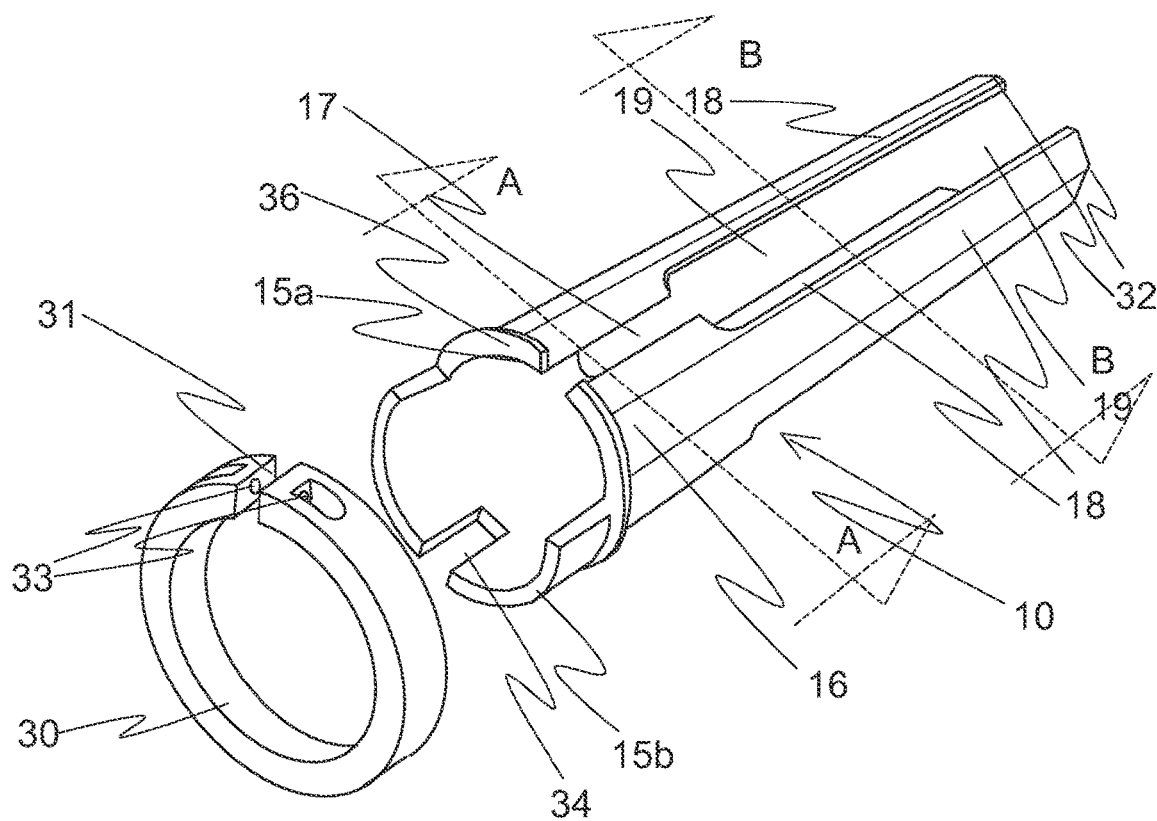
FIG. 1a depicts an inner core of the grip assembly according to the invention seen obliquely from above. Broken lines A-A and B-B indicate planes upon which a section view is taken in FIG. 1c.

In FIG. 1a an example of an inner core 10 of the grip assembly according to the invention is shown obliquely from above. The inner core contains a tubular base part 16 having a first end and second end. Three wings 18 extend from the second end of the base part to same direction. Between each adjacent two wings there is a slot 19.

All wings have substantially equal shapes and dimensions. The wings are evenly distributed over the periphery of the base part and the widths of the slots are substantially equal. The wings are slightly inwards curved in the longitudinal direction, when the wings are in non-strained condition, i.e. when no external force is acting to the wings. The fictitious circle defined by the tips 32 of the inwards curved wings has a smaller radius than the radius of the base part 16. The inner core is made of substantially hard but slightly flexible material. Preferably the inner core is made of PP-GF (Polypropylene with fiber glass) or PP-CF (polypropylene with carbon fiber) by injection moulding.

On the first end of the base part there is a first end rim 15a and a second end rim 15b. The length of both end rims is substantially half of the periphery of the base part. The distance from the tips 32 of the wings 18 to the first end rim 15a is smaller than the distance from the tips 32 to the second end rim 15b, i.e. first and second end rims are at different levels. In the middle of the second end rim there is a slit 34 extending to the level of first end rim. The wall of the base part is cut by a gap 17 extending from the bottom of one slot 19 to the first end rim 15a of the base part 16. Thus, the cross-section of the base part is not a full circle, but a circle missing a short part of its periphery. Around the base part 16 is a surrounding collar 36.

The inner core is configured to be fitted around a bicycle handlebar (not shown in the figure) having circular cross-section. Therefore, the inner surface of the base part 16 has a cylindrical shape. The wings extending from the second end of the base part have a curved inner surface, the radius of curvature in the inner surface of the base part and in the inner surface of the wings being substantially equal.

The inner core 10 is attached to the handlebar with a separate lock ring 30. Lock ring is an annular item having two ends, which are separated by a short clearance 31. In both ends of the lock ring there is a recess and a hole 33 for a locking screw (not shown in the figure). When the inner core is installed to the handlebar, lock ring is fitted around the first end of the base part enclosing the collar and the locking screw is screwed tightly into the hole 33. The lock ring clamps the inner core to the handlebar securing the inner core to the handlebar. The slit 34 and the gap 16 facilitate small deformations in inner core, when the inner surface is pressed against the outer surface of the handlebar.

Figure 1B:
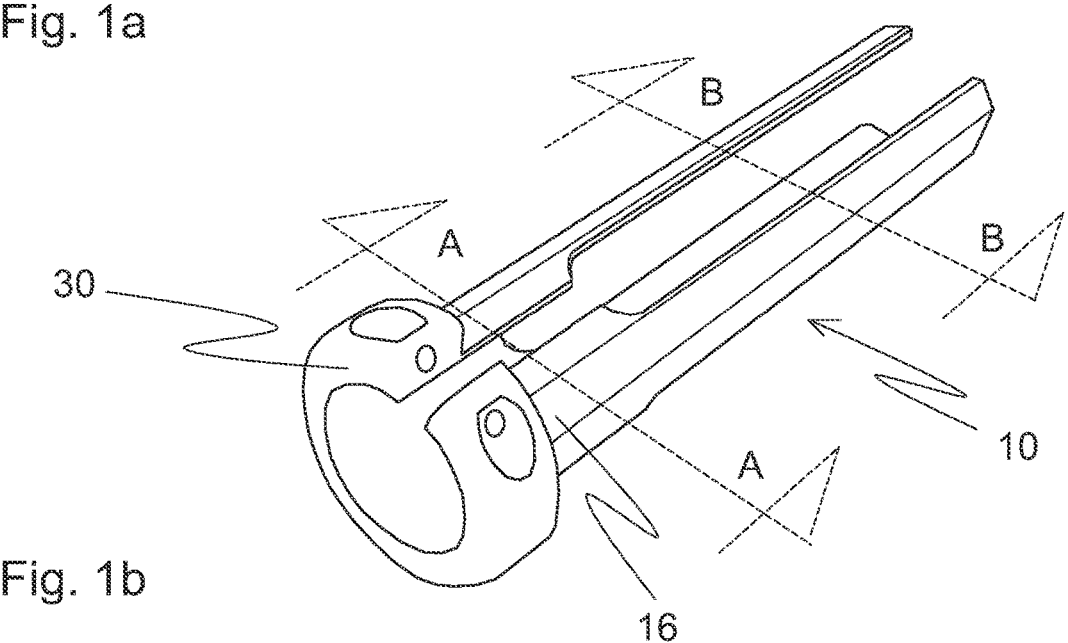
FIG. 1b depicts a first preferred embodiment of the inner core of the grip assembly according to the invention seen obliquely from above. Broken lines A-A and B-B correspond to the broken lines shown in FIG. 1a and indicate planes upon which a section view is taken in FIG. 1c.

In FIG. 1b an example of a preferred embodiment of the inner core 10 of the grip assembly according to the invention is shown obliquely from above. The embodiment shown in FIG. 1b contains the same features as the inner core depicted in FIG. 1a. The embodiment of 1b differs from the inner core of FIG. 1a only in that the lock ring 30 is not a separate part but it is integrated to the base part 16 of the inner core.

In FIG. 1c two cross-sections of the inner cores of FIGS. 1a and 1b is show. First cross-section A-A depicts the base part 16 of the inner core 10 and second cross section B-B depicts the wings 18 of the inner core. The outer surface of the inner core comprises a number of adjacent flat surfaces. Between each adjacent surface there is a blunt corner. Blunt corner means, that the angle between adjacent flat surfaces is more than 90 degrees but less than 180 degrees. The shape of the outer surface of the base part is thus almost a full polygon, where one side is cut by a gap 17. The number of flat surfaces, i.e., the number of sides of the polygon, can be selected. Preferably, the number of flat surfaces is 6 to 12.

The shape of the outer surface stays constant from the first end of the base part to the tips of the wings, but the slots 19 divide the cross section to three parts as shown in section B-B. The outer surface of each wing contains two flat surfaces in slanted position. The outer surface of the base part 16 and the outer surface of the wings 18 together constitute the first contact surface 12 of the inner core.

The shape of the inner surface of the base part is cylindrical and the shape of the inner surface of the wings is chute-like. The inner surfaces of the base part and wings together constitute the second contact surface 14 configured to be pressed against the surface of the handlebar, when the grip assembly is installed to the handlebar.

Figure 1D:
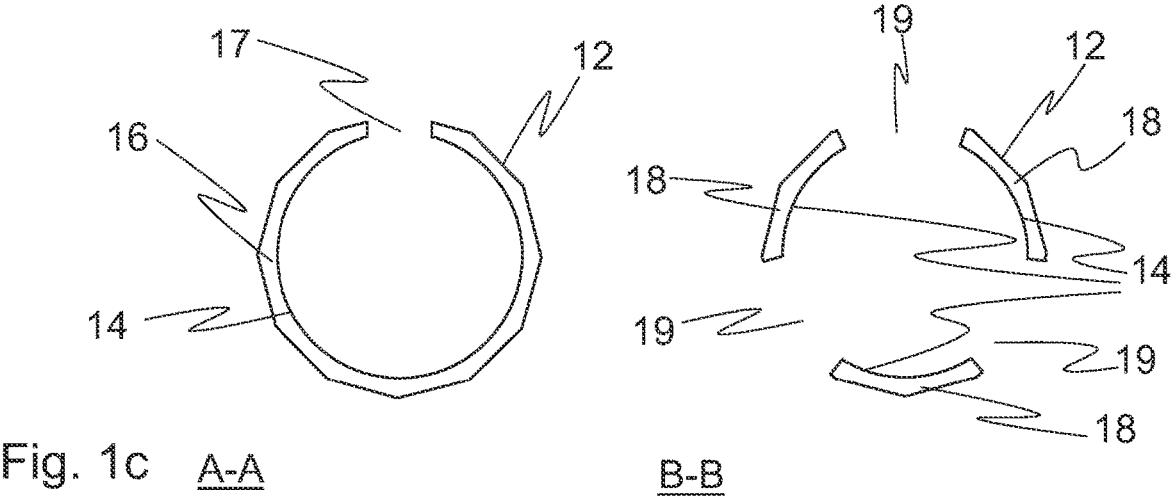
FIG. 1d depicts cross-sections of a second preferred embodiment an inner core according to the invention.
Figure 1D:
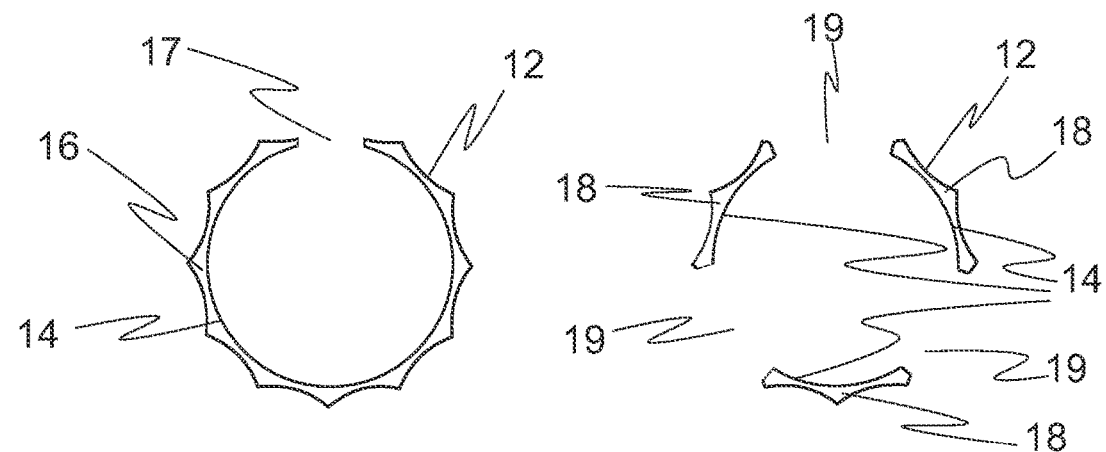

In FIG. 1d two cross-sections of another preferred embodiment of the inner core according to the invention is show. Cross-section C-C depicts the base part 16 of the inner core 10. The outer surface of the inner core comprises a number of adjacent surfaces as in FIG. 1c. However, in this embodiment the surfaces are not flat, but they are chute-like surfaces having concave cross-section. Between each adjacent surface there is a blunt corner. The number of concave surfaces can be selected. Preferably, the number of surfaces is 6 to 12.

As in the inner core shown in FIG. 1c, the shape of the outer surface stays constant from the first end of the base part to the tips of the wings, but the slots 19 divide the cross section to three parts. The outer surface of each wing contains two chute-like surfaces in slanted position. The outer surface of the base part 16 and the outer surface of the wings 18 together constitute the first contact surface 12 of the inner core.

The shape of the inner surface of the base part is cylindrical and the shape of the inner surface of the wings is chute-like as in the inner core shown in FIG. 1c.

In FIG. 2a an example of an outer sleeve 20 of the grip assembly according to the invention is shown obliquely from above. The outer sleeve is a tubular part defining a cavity having an open first end and a closed second end. On the inner surface 21 of the outer sleeve, i.e. on the surface facing the cavity, is a third contact surface 22. The third contact surface and the first contact surface have a substantially similar shape, i.e. the inner surface contains flat or concave surface sections in angled position. The inner surface further comprises three ribs 28 protruding from the inner surface and having matching shapes and dimension with the slots 19 of the inner core 10 (in FIG. 2a only one rib is shown). The ribs are configured to project into the slots 19 in the inner core 10, when the outer sleeve is installed to enclose the inner core. The ribs have a fourth contact surface 28, which is configured to settle against the outer surface of the handlebar, when the grip assembly is installed to the handlebar. The fourth contact surface has a chute-like shape.

The outer sleeve is softer than the inner core. The softness is based partly to the manufacturing material and partly to the structure of the outer sleeve. The structure of the outer sleeve can be foamy, cellular or gel-like. The outer sleeve can be made of TPE (Thermoplastic elastomer) or TPU (Thermoplastic urethane) TPU—foam, silicone gel or silicone foam. The outer sleeve can be made by injection moulding, extruding, vacuum moulding or by 3D-printing.

In FIG. 2b one end of a bicycle handlebar 100 comprising a grip assembly according to the invention is shown and in FIG. 2c a cross-section C-C of the handlebar of FIG. 2b is shown. In the following both figures are explained simultaneously.

The bicycle handlebar of FIG. 2b is a shaped metal tube having two ends. Both ends of the handlebar are furnished with a grip assembly according to the invention. When mounting the grip assembly, the outer sleeve 20 is first mounted on top of the inner core to enclose the base part 16 and wings 18 of the inner core. After that the combined inner core 10 and outer sleeve are installed to the handlebar by inserting the end of the handlebar inside inner core. When installing the grip assembly, the ribs 26 of the outer sleeve enter to the slots 19 between the wings 18. The slots and the ribs have equal dimensions, whereby the ribs fill the slots fully, when the grip assembly is installed in place.

During installation of the inner core and outer sleeve to the handlebar the wings and the fourth contact surface 28 of the outer sleeve slide along the surface of the handlebar.

Since friction between the hard wings and the handlebar is quite low, the overall friction force resisting the insertion of the handlebar inside the grip is not too high, whereby the installation can be done without lubricants and/or pneumatic devices. The grip assembly is locked in place by tightening the locking screw 38 of the lock ring 30. When the locking screw is tightened, the lock ring clamps the base part 16 of inner core to the handlebar securing the inner core immovably to the handlebar.

The outer sleeve 20 stays on top of the inner core mainly because of friction force acting between the first contact surface 12 of the inner core and third contact surface 22 of the outer sleeve. This friction force prevents the linear movement of the outer sleeve in the longitudinal direction of the handlebar. Before the outer sleeve is installed, the wings are in slightly curved shape the tips of the wings resting against the outer surface of the handlebar. When the outer sleeve and the inner core are pushed in place to enclose the handlebar end, the outer sleeve presses the second contact surfaces 14 of the wings tightly against the outer surface of the handlebar, whereby the tips of spring-like wings tend to rise outwards, i.e. away from the surface of the handlebar. This deformation of the wings enhances the friction force between the first and third contact surfaces. Friction force acts also between the fourth contact surfaces 28 of the ribs 26 of the outer sleeve and the surface of the handlebar. The material of the ribs is soft, which provides good contact and friction between the fourth contact surface and the surface of the handlebar.

The rotational movement of the outer sleeve, i.e., twisting of outer sleeve around the handlebar, is prevented mainly by the mechanical interlocking between inner core 10 and the outer sleeve 20. The mechanical interlocking is achieved by two factors. Firstly, the substantially polygonal shape of inner surface of the outer sleeve and the first contact surface prevents the outer sleeve from rotating around the inner core. Secondly, the ribs, which occupy the slots between the wings, act as rotating preventing cushions, because the ribs cannot roll over the wings. Further, the friction between the fourth contact surface and the surface of the handlebar also resists rotational movement.

Removing the grip assembly from the handlebar is done in opposing order, i.e. first loosening the locking screw and then pulling the combined inner core and outer sleeve free from the handlebar. After that, the inner core and the outer sleeve are separated by pulling them apart. The worn outer sleeve can be replaced by a new one which is installed to enclose the old inner core.

On the outer surface of the outer sleeve there may be a top layer 40, which can be made of different material or may have a different structure than the rest of the outer sleeve. The top layer may be a wear-resistant skin, fabric or artificial or genuine leather protecting the softer and less durable inner material of the outer sleeve.

Some preferred embodiments of the invention have been disclosed above. The invention is not limited to the solutions explained above, but the invention can be applied in different ways within the limits set by the patent claims.

REFERENCE SIGNS

10 inner core
12 first contact surface
14 second contact surface
15a first end rim
15b second end rim
16 base part
17 gap
18 wing
19 slot
20 outer sleeve
21 inner surface
22 third contact surface
24 groove
26 rib
28 fourth contact surface
30 lock ring
31 clearance
32 tip
33 hole
34 slit
36 collar
38 locking screw
40 top layer
100 handlebar

The invention claimed is:

1. A bicycle handlebar grip assembly, comprising:
an inner core having a first contact surface and an outer sleeve having an inner surface and a third contact surface on the inner surface, which inner core and outer sleeve are separate parts, which are configured to be bonded together by friction force acting between the first contact surface of the inner core and the third contact surface of the outer sleeve and which outer sleeve is configured to enclose at least a major part of the inner core, when the grip assembly is installed to a handlebar, wherein
the inner core has a substantially annular base part, at least two substantially parallel wings extending from the base part and slots between the adjacent wings and wherein said assembly further comprises a clamp for securing the base part of the inner core to the handle bar, and the inner surface of the outer sleeve has grooves configured to receive the wings of the inner core when the grip assembly is installed to the handlebar.

2. The grip assembly according to claim 1, wherein the first contact surface of the inner core comprises a number of adjacent flat or concave surfaces and between each adjacent surface there is an angle.

3. The grip assembly according to claim 1, wherein the wings have a chute-like second contact surface configured to be pressed against the outer surface of the handlebar, when the grip assembly is installed to the handlebar.

4. The grip assembly according to claim 1, wherein the wings are flexible, spring-like elements.

5. The grip assembly according to claim 1, wherein in non-strained condition the wings are in a curved form in the longitudinal direction on the wing.

6. The grip assembly according to claim 1, wherein said clamp comprises an annular lock ring.

7. The grip assembly according to claim 6, wherein said clamp comprises separate parts configured to clamp the base part of the inner core to the outer surface of the handlebar.

8. The grip assembly according to claim 1, wherein said clamp is integrated to the base part of the inner core.

9. The grip assembly according to claim 1, wherein said grooves and said wings have matching dimensions.

10. The grip assembly according to claim 1, wherein between the grooves in the inner surface there are ribs, which ribs are configured to enter the slots in the inner core, when the grip assembly is installed to the handlebar.

11. The grip assembly according to claim 10, wherein said ribs and said slots have matching dimensions.

12. The grip assembly according to claim 10, wherein the ribs have a fourth contact surface configured to be pressed against the outer surface of the handlebar, when the grip assembly is installed to the handlebar.

13. The grip assembly according to claim 1, wherein said inner core and said outer sleeve are made of different materials.

14. The grip assembly according to claim 1, wherein the material of said outer sleeve is softer than the material of said inner core.

15. The grip assembly according to claim 1, wherein the inner core comprises fiber reinforced plastic and the outer sleeve comprises TPE (thermoplastic elastomer), TPU (thermoplastic urethane), TPU—foam, silicone gel or silicone foam.

16. The grip assembly according to claim 1, wherein the outer sleeve is made by injection moulding, extruding, 3D-printing or by vacuum moulding.

17. The grip assembly according to claim 1, and wherein on the outer surface of the outer sleeve there is a top layer, which top layer and outer sleeve are made of different materials.

18. The grip assembly according to claim 17, wherein the top layer is at least partly made of fabric, genuine leather or artificial leather.

19. A bicycle handlebar comprising at least one grip assembly, wherein said grip assembly contains the features of claim 1.

* * * * *